May 2, 1950     W. W. HENNING     2,506,360
TRACK TENSIONING APPARATUS FOR CRAWLER TRACTOR
Filed May 7, 1945
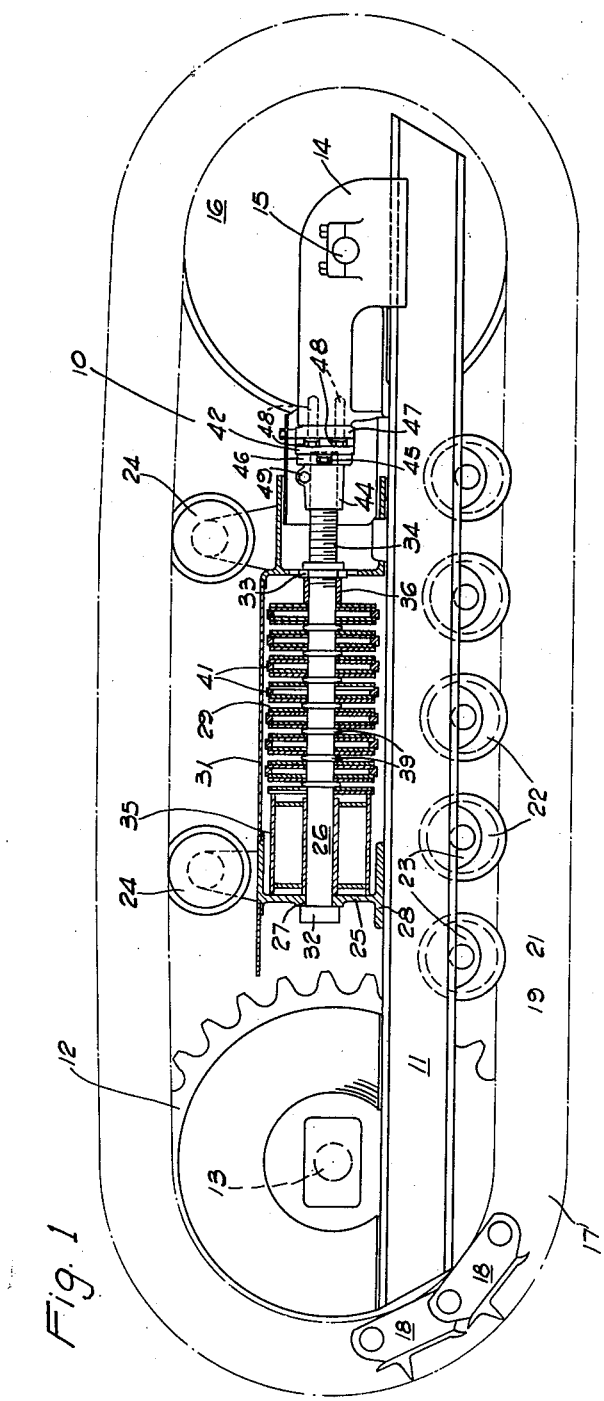
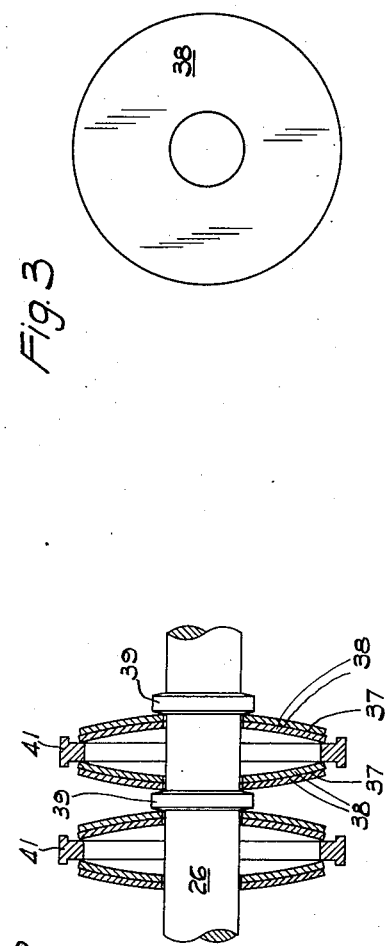
Inventor:
William W. Henning
by Paul O. Rippel
Attorney Patented May 2, 1950

2,506,360

UNITED STATES PATENT OFFICE 2,506,360

TRACK TENSIONING APPARATUS FOR CRAWLER TRACTOR

William W. Henning, River Grove, Ill., assignor to International Harvester Company, a corporation of New Jersey Application May 7, 1945, Serial No. 592,357

6 Claims. (Cl. 305—9)

This invention relates to apparatus for maintaining a desired tension in the tracks of crawler tractors and principally concerns such an apparatus employing a captive spring arrangement utilizing a series of concavo-convex springs in lieu of the conventional single-piece helical spring.

An important object of this invention is the provision in a track-tension apparatus of a novel spring arrangement wherein, after compression of the spring to its operating pressure range, the increment of reactive force exerted thereby per unit of linear compression is less than during the initial stages of compression and remains a positive factor throughout the operating range. The advantage of this operating characteristic is the adaptability of the spring to build up a sufficient reactive force pursuant to a relatively small initial linear compression and to thereafter possess a large linear operating range in which there is small change in the reactive force per unit of linear displacement or compressions, so the track can yield coordinately greater amounts without creating a tremendous reactive force in the spring.

Another object is the provision of a spring of the present character that is assembled from a plurality of annular plate-like components which are easily manipulated when assembling or dismantling the unit. The importance of this factor is comprehensible when considering that in some of the larger tractors the single-piece track tensioning springs weigh 450 lbs. Another advantage of the plate-like components is the adaptability of the spring unit to function subsequent to breakage of one or more of the plates, in contrast to the single-piece spring which if broken makes the vehicle unserviceable. Also, in the event of breakage, the cost of only the broken plate or plates is involved instead of the entire spring unit.

Still a further object is the provision of a new track tensioning spring unit in which component parts slide upon one another when the unit is flexed, whereby an inherent damping effect is produced to diminish the force and speed of recoil recovery following compression of the spring unit.

These and other desirable objects inherent in and encompassed by the invention will be more clearly understood upon reading the ensuing description with reference to the annexed drawings, wherein:

Fig. 1 is a side elevational view of a crawler tractor track frame together with parts carried thereby including a track tension apparatus constituting a preferred embodiment of the present invention and of which parts are shown in section.

Fig. 2 is an enlarged fragmentary sectional view taken upon a plane extending centrally and axially through a section of the spring portion of the apparatus.

Fig. 3 is an end elevational view of a spring plate constituting one of the elements of the spring in the apparatus.

The track frame 10 shown in Fig. 1 comprises inner and outer channel members extending lengthwise thereof in opposed spaced relation and of which channel members the latter is designated 11. A track driving sprocket 12 is mounted between the channel members as 11 adjacently to their rear ends and is rotatably carried upon a bearing concentric with a pivot shaft 13. At the forward end of the track frame, bearing heads 14 slidable fore and aft respectively upon the channel members, carry a shaft 15 upon which an idler roller 16 is journaled for supporting the front end of an endless track 17. Only two representative links 18 are shown in detail, the remaining part of the track being diagrammatically illustrated by the dot-dash lines 19 and 21. Hold-down rollers 22 for the lower flight of the track 17 are carried in suitable bearings 23 depending from the channel members as 11. The upper flight of the track is supported by rollers 24 carried upon suitable bearings supported by the track frame.

The track driving sprocket 12 is immovable lengthwise of the track, while the idler 16 is normally yieldably maintained in a fixed position lengthwise of the track by the track tensioning apparatus now to be described. It is the purpose of this track tensioning apparatus to resist backward displacement of the track idler 16 lengthwise of the frame toward the driving sprocket 12 with a comparatively great force, while at the same time avoiding urging of the idler forwardly beyond the desired limit. This accomplishes the prevention of undesired slack in the flights of the track without placing the track in a condition of tautness which would accelerate wear at the track link joints. A captive spring arrangement is utilized for attaining this operating condition.

The captive spring arrangement comprises telescopically associated members 25 and 26 of which the former is a bracket-like member having a central opening 27 and a flanged footing portion 28 suitably anchored to the track frame, and of which the latter is in the form of a rod slidable coaxial and within the opening 27. These members 25 and 26 function as spring-reaction means for a compositely constructed spring 29 contained within a spring chamber 31. Spring 29 is a compression spring which when installed exerts an expansive force endwise of the track frame. Said spring is held captive between stop means components in the form of a stop member head 32 on the rear end of the rod 26 and a stop member nut 33 on a threaded portion 34 of the rod 26.

In the present structure, a large tubular spacer member 35 is disposed upon the rod 26 between the rear end of the spring 29 and the fixed spring reaction means 25, while a small spacer collar 36 is disposed in like fashion between the front end of the spring and the nut 33.

The spring 29 includes a plurality of paired spring element structures 37 of which each, in the present instance, includes two annular cupped spring plates 38 in nested assembly. Alternate of the spring element structures 37 are disposed upon the rod 26 so as to face oppositely to the intervening structures, and inner and outer rings 39 and 41 are placed about rod 26 alternately with the spring element structures so that each pair of structures has a ring 41 therebetween for bearing between their outer rims and so that each pair of structures has a spacer ring 39 disposed therebetween and the next adjacent pair of structures for bearing against the inner rim portions of the adjacent plates. Spacers 41 are floatingly carried by their associated pair of spring element structures. Spacer elements are slidable lengthwise upon the rod 26.

The spring plates 38 and the rings 39 and 41 are assembled onto the rod 26 prior to the placing of the collar 36 and the threading of the nut 33 onto said rod, and at this time the plates, while released, are in concavo-convex formations as illustrated in Fig. 2. In conditioning the apparatus for use, the spacer collar 36 is fed onto the rod 26 forwardly of the forward end of the spring as is the nut 33, whereupon the latter is turned upon the threaded portion 34 to compress the composite spring while the stop member 32 or head upon the left end of the rod reacts against the member 25. As the nut 33 is tightened, the bowed or dished plates 38 will be distorted pursuant to compression of the spring, and the spacer rings 39 and 41 will be advanced somewhat rearwardly endwise of the frame. Ultimately the spring will be held captive in a condition similar to that illustrated in Fig. 1 wherein the initially cupped spring plates assume a substantially planar formation and exert an endwise expansive force.

An adjusting assembly 42 is used for connecting the slidable bearing head 14 for the track idler 16 with the forward end of the rod 26. This adjusting structure comprises an internally threaded split collar 44 of which the threads mesh with the threaded portion 34 of the rod 26. A pair of diametrically opposed cap screws 45 in a flanged end portion 46 of the split collar secure the same to a cross member 47 which extends between and is connected to the back ends of the bearing heads as 14 upon opposite sides of the idler 16 by cap screws 48. While the rod 26 is yieldably held with a great force against endwise movement by the compressed captive spring 29, adjusting of the idler 16 endwise of the track frame for obtaining the desired limit of slack in the track 17 can be obtained by removing the cap screws 45, loosening a cap screw 49 in the split collar 44, and thereafter rotating said collar for advancing or retracting the same lengthwise of the rod 26. When the desired adjustment has been accomplished the set screws 45 will be replaced and tightened for securing the bearing heads 14 to the rod 26, and the set screw 49 will be retightened as a safeguard against accidental rotation of said rod.

With the apparatus thus in a condition of adjustment as that illustrated in Fig. 1, should a stone or other hard foreign object be carried into a position between the front edge of the idler 16 and the inner periphery of the track, said idler, the bearing heads 14, and the rod 26 could move rearwardly incident to further compressing the captive spring 29 and displacing the rod head 32 rearwardly from the member 25 which is telescopically associated with said rod. Subsequent to dislodgement of the hard foreign object, the spring 29 will recover to the status shown in Fig. 1, bringing the stop 32 against the rear end of the member 25 and causing the idler 16 to be projected forwardly into the desired track-tightening position.

As the idler 16 and the rod 26 are forced rearwardly in the just described manner, the spring element plates 28 within each nest of such plates will be caused to bear hard upon one another and to slide upon one another. Thus internal friction is present in the composite spring, and this internal friction continues to obtain during the recovery of the spring as well as during its increment of compression so that a damping effect is had for limiting the speed of recovery and correspondingly limiting shock and strain which would otherwise be imposed upon the apparatus.

When the nut 33 is advanced far enough upon the threaded rod 26 to commence initial compression of the spring 29, the spring plates 38 of the form illustrated in Fig. 2, will at first develop a relatively high reactive force per unit of linear compression of the spring. As the linear compression of the spring continues, the ratio of reactive force increment per unit of linear compression will diminish at a decelerated rate until a state of compression and distortion approaching that illustrated in Fig. 1 is attained, at which time the force increment per unit of linear compression will assume substantially a constant wherein the increment of force is relatively small with respect to the linear unit of compression, although the entire reactive force will be large. This gives a so-called straight line portion of an operating curve constituting a zone in which the captive spring will operate when the track idler is subjected to the force of a foreign object accidentally interposed between the front of this idler and that portion of the character thereupon.

Having thus described a preferred form of the invention with the view of clearly illustrating the same, I claim:

1. In a track tensioning apparatus for a crawler tractor; a track frame; spring-reaction means anchored to the frame and having an axis extending lengthwise of the frame; a second spring-reaction means in axial registration with the first means and movable axially thereof while exerting a tensioning force against the track; and a captive spring assembly comprising a series of annular plate-like spring element structures which assume concavo-convex shapes when relaxed, said structures being arranged coaxially of one of said spring-reaction means and distributed axially thereof with adjacent of said structures in pairs wherein their concave faces are in opposed spaced relation, wherein outer rim portions of the structures in said pairs are in compressive force reactive relation axially of the assembly and wherein the inner rim portions of said structures are in force reactive relation with respective corresponding inner rim portions in the adjacent pairs of structures, and stop means including components at opposite ends of said series, said stop means components being reactive through the one spring-reaction means to hold said structures captive in an axially partially compressed condition wherein the structures are substantially planar, and the other of said spring-reaction means reacting compressively against an end of the compressed series.

2. In a track tensioning apparatus for a crawler tractor; telescopically associated members; means limiting telescopic movement of the members in one direction; and a captive spring assembly reacting between said members for urging them to telescope in the one direction but compressible to facilitate their telescopic movement in the opposite direction, said assembly comprising pairs of plate-like annular spring element structures disposed coaxially of said telescopic members in compression series formation, said element structures assuming concavo-convex shapes when relaxed and the structures in each pair being disposed with their concave faces in opposed spaced relation and with the outer rim portions thereof in compressive force relation while the inner rim portions thereof are in respective compressive force relation with the corresponding rim portions of adjacent structures of adjacent pairs, spacer elements respectively between said outer rim portions of the structures in said pairs of structures, and spacer elements respectively between the inner rim portions of the adjacent pairs, said telescopically associated members being cooperative with said spacer elements to compress the spring assembly an amount reversing the concavo-convex formation of said structures with respect to that obtaining when they are relaxed pursuant to said telescopic movement of said members, and said telescopic limiting means cooperating with the telescopically associated members and with said spacer elements to prevent recovery of said structures substantially beyond a planar condition.

3. In a track tensioning apparatus for a crawler tractor; relatively linearly movable members; means limiting such relative movement of the members in one direction; a captive spring assembly reacting between said members for urging their relative linear movement in the one direction but compressible to facilitate their relative movement in the opposite direction, said assembly comprising pairs of plate-like annular spring structures disposed in coaxial end-to-end relation for exerting an axial expansive force applied to said members for urging them in said one relative direction, said structures assuming a concavo-convex formation when relaxed and the structures in each pair being disposed with their concave faces in opposed spaced relation and with outer rim portions thereof in compressive force applying relation while the inner rim portions thereof are in respective force applying relation with the corresponding rim portions of adjacent structures in adjacent pairs, spacer elements respectively between said outer rim portions of the structures in said pairs of structures, and spacer elements respectively between the inner rim portions of the adjacent pairs, and said spacer elements cooperating with the linearly movable members to compress said structures into a reversed concavo-convex formation pursuant to such relative movement of said members in the opposite direction, said structures being bowable to change the radial curvature therein pursuant to variation in the length of the assembly and variation in the force exerted thereby, and at least part of said structures each including a plurality of plate-like nested elements corresponding in concavo-convex formation with their respective structures and slidable upon one another pursuant to said change in curvature.

4. In a track tensioning apparatus for a crawler tractor having an elongated track frame serving as a mounting for an endless track, spring-reaction means anchored to said frame, a second spring-reaction means retractively advanceable endwise of the frame to exert a tensioning force against the track, means limiting the advancement of the second spring-reaction means relatively to the first thereof, compressible spring means reactable between said spring-reaction means for yieldably maintaining the second spring-reaction means at its advancement limit, said compressible spring means comprising a series of axially-alined annular cupped spring plates grouped in assemblies of nested plates, alternate of said assemblies being arranged with their cupped faces turned oppositely to the cupped faces of the intervening assemblies to dispose their inner and outer rim portions for reacting axially oppositely respectively against the inner and outer rim portions of assemblies at opposite ends thereof, and spacer means between said assemblies, said spacer means accommodating deformation of said assemblies into a shape reversing their cupping with respect to that existing when they are relaxed, said spacer means cooperating with the first and second reaction means for placing said assemblies in substantially a planar formation while the second reaction means is at its advancement limit, and the plates in said assemblies being slidable upon one another to dampen recoil as variation occurs in their degrees of cupping, pursuant to axial contraction and expansion of the series.

5. In a track tensioning apparatus for a crawler tractor having an elongated track frame for the mounting of an endless track, spring-reaction means anchored to said frame, a second spring-reaction means retractively advanceable endwise of the frame to exert a tensioning force against the track, one of said means including a rod extending lengthwise of the track, means limiting the advancement of the second reaction means relatively to the first thereof, compressible spring means reactable expansively between the spring-reaction means for yieldably maintaining the second thereof at its advancement limit, said spring means comprising a series of axially-alined annular cupped spring plates arranged coaxially about said rod and grouped in assemblies of nested plates, alternate of said assemblies being arranged with their cupped faces turned oppositely to the cupped faces of the intervening assemblies to place their inner and outer rims respectively adjacent to the inner and outer rims of the intervening assemblies at the opposite ends thereof, and spacer means between said assemblies, said spacer means accommodating deformation of said assemblies into a shape reversing their cupping with respect to that existing when they are relaxed, said spacer means cooperating with the first and second reaction means for placing said assemblies in substantially a planar formation while the second reaction means is at its advancement limit, the plates in said assemblies, being slidable upon one another when their assemblies are flexed attendant to variation in compressive force applied to the ends of the series, inner spacer rings slidable axially on said rod and disposed between the adjacent inner rims of said assemblies, and outer spacer rings disposed between and carried by the adjacent outer rims of said assemblies.

6. In a track tensioning apparatus for a crawler tractor having an elongated track frame for the mounting of an endless track, a first spring-reaction means anchored to said frame, a second spring-reaction means retractively advanceable endwise of the frame to exert a tensioning force on the track, the second spring-reaction means including a rod telescopically associated with the first of such means, means limiting the advancement of the second spring-reaction means, compressible spring means reactable expansively between the spring-reaction means for yieldably maintaining the second thereof at its advancement limit, said spring means comprising a series of axially-alined annular cupped spring plates arranged coaxially about said rod and grouped in assemblies of nested plates, alternate of said assemblies being arranged with their cupped faces turned oppositely to the cupped faces of the intervening assemblies to place their inner and outer rims respectively adjacent to the inner and outer rims of the intervening assemblies at the opposite ends thereof, and spacer means between said assemblies, said spacer means accommodating deformation of said assemblies into a shape reversing their cupping with respect to that existing when they are relaxed, said spacer means cooperating with the first and second reaction means for placing said assemblies in substantially a planar formation while the second reaction means is at its advancement limit, the plates in said assemblies being slidable upon one another when their assemblies are flexed attendant to variation in compressive force applied to the ends of the series, inner spacer rings slidable axially on said rod and disposed between the adjacent inner rims of said assemblies, and outer spacer rings disposed between and carried by the adjacent outer rims of said assemblies.

WILLIAM W. HENNING.

REFERENCES CITED

The following references are of record in the file of this patent:

UNITED STATES PATENTS

| Number | Name | Date |
| --- | --- | --- |
| 1,826,597 | Brecht | Oct. 6, 1931 |
| 2,263,107 | Smirl | Nov. 18, 1941 |
| 2,284,821 | Heaslet | June 2, 1942 |
| 2,387,266 | Holland | Oct. 23, 1945 |